US006006411A

United States Patent [19]

Kilgore et al.

[11] Patent Number: 6,006,411

[45] Date of Patent: Dec. 28, 1999

[54] BEARING CARRIER PULLER IMPROVEMENTS

[75] Inventors: Gary H. Kilgore, San Antonio, Tex.; William S. Short, Buford, Ga.

[73] Assignee: Motorbay Company, San Antonio, Tex.

[21] Appl. No.: 09/159,197

[22] Filed: Sep. 23, 1998

[51] Int. Cl.$^{6}$ .................... B23P 19/04

[52] U.S. Cl. .................... 29/263

[58] Field of Search .................... 29/256, 263, 264; 254/98

[56] References Cited

U.S. PATENT DOCUMENTS 3,846,898 11/1974 Kerr .
4,236,291 12/1980 Barrow .
4,864,709 9/1989 Klucz .
5,058,256 10/1991 Taylor .
5,836,067 11/1998 Cochran .................... 29/263

*Primary Examiner*—Timothy V. Eley
*Assistant Examiner*—Benjamin M. Halpern

[57] ABSTRACT

This bearing carrier puller for extracting a bearing carrier from a lower gear case of a marine drivetrain consists of three components: a boss which envelopes a propeller shaft and is secured to it by a nut and washer; a block which bears against a lower gear case of a marine drivetrain; and a nut which threads over the boss and bears against the block to extract a bearing carrier. A first disclosed improvement prevents rotation of the boss relative to the block by means of structural configurations on the mating surfaces of the block and boss. A second improvement prevents the boss from being drawn through the block beyond a desired point by means of a stop. An additional embodiment of the second improvement prevents the nut from traveling on the boss in the direction of a first end beyond a desired point by means of a stop. A third improvement enhances gripping of the block with a wrench by means of a polygonal surface configuration extending along the periphery of the block from its' second end.

3 Claims, 4 Drawing Sheets

BEARING CARRIER PULLER IMPROVEMENTS

BACKGROUND OF THE INVENTION

1. Field of Invention

The bearing carrier puller improvements disclosed in this document provide a simplified method of removing a bearing carrier from a Mercruiser lower gear case, thus minimizing the risk of damage to a lower gearcase during removal of its' bearing carrier. The advantage of this tool over the prior art is that a mechanic's helper, with minimal skills, can perform the otherwise difficult task of removing a bearing carrier, thus reducing the work load on the mechanic.

The lower gear case of a marine drivetrain is subject to substantial abuse. Impact with submerged obstacles and the bottom, operator error, and poor maintenance all contribute to a triving repair industry.

Unfortunately, the use of recreational marine craft is largely a seasonal pursuit, resulting in a cyclical income stream for most marine mechanics. During the boating season, a marine mechanic is inundated with urgent repair orders. However, as the weather cools, the mechanic's income depends on the foresight of experienced customers who realize that the off season is the time to schedule boat work. Consequently, the permanent staffing at a marine repair shop will be the number of people who can be financially supported by the work generated in the off season. When the work load picks up in the boating season and the work capacity of the permanent staff is exceeded, delays are unavoidable. Mechanics are reluctant to invest their time and risk their customer's property to train temporary help. Therefore, work that requires more than rudimentary skills waits in line for the skilled permanent staff.

With an eye to efficient and effective completion of repair orders during the busy boating season, it is of particular advantage to marine repair shops to simplify as many tasks as possible to a level that may be performed by unskilled help. Bearing carrier removal is a tricky task that is reduced to a rudimentary skill level with the improvements that we have made to Barrow's Bearing Carrier Puller for Outboard Motors, U.S. Pat. No. 4,236,291, issued in 1980.

2. Discussion of Prior Art

Marine mechanics currently use the following tools to remove bearing carriers from lower gear cases:

A common method of removing a bearing carrier is to insert a gear puller into the bearing carrier, grip it at the edge and bear against the propeller shaft to dislodge the bearing carrier. This procedure has two distinct disadvantages: pulling the edge of the bearing carrier may cause it to crack and fail, compounding the service problem; and bearing against the propeller shaft to dislodge the bearing carrier may press the shaft into the housing rather than withdraw the bearing carrier, again exacerbating the problem.

A second method of removing a bearing carrier is to use a Bob Kerr tool. Kerr was issued U.S. Pat. No. 3,846,898 for this tool in 1974. This tool grips the bearing carrier with a pair of hooks and bears against the propeller shaft to dislodge the bearing carrier. As in the case of a gear puller, there is a risk of driving the propeller shaft instead of pulling the bearing carrier. It is a good tool, but it requires a knowledgable hand.

A third method of removing a bearing carrier is to use Randy Barrow's Bearing Carrier Puller of Outboard Motors. Barrow was issued U.S. Pat. No. 4,236,291 for this tool in 1980. This is a very well designed tool that is almost idiot proof. This tool consists of: a block which provides a bearing against the gear case; a boss that secures the propeller shaft relative to the block; a handle extending from the boss to rest against the gear case; and a nut that is rotated to extract the boss, propeller shaft, and bearing carrier as one unit from the gear case. However, this tool requires a skilled operator because improper use may result in a bent gear shifter, compounding the service problem. The novelty disclosed in the claims of the present document are improvements to this tool that overcome this failing.

A fourth method of removing a bearing carrier is to use Precision's propeller and bearing carrier puller. Francis Klucz and Norm Brunet were issued U.S. Pat. No. 4,864,709 for this tool in 1989. This tool grips the bearing carrier and bears against the propeller shaft similar to Kerr's tool. This is also a very good tool, but like Kerr's tool or a gear puller, it's requires skill to use properly.

A fifth method of removing a bearing carrier is to use Cochran's bearing carrier puller. Danny Cochran, a marine mechanic in Flowery Branch, Georgia, applied for a patent on his bearing carrier puller in 1996 (approx.), and has been making and selling his tool since 1997. This tool is similar to Barrow's, it consists of: a block which bears against the gear case; and a Torrington bearing, which is placed between the block and a nut on the propeller shaft. It dislodges the bearing carrier and propeller shaft as one unit when the nut is rotated on the propeller shaft. The differences between Cochran's and Barrow's tools are: Cochran's tool includes gripping means that engage the splines of the propeller shaft to check rotation of the shaft; Cochran's tool includes a Torrington bearing to reduce friction between the block and the prop nut; Barrow's tool includes a boss that engages the propeller shaft and in turn, travels by rotation of a nut; a handle extends from the boss on Barrow's tool; Barrow's tool also includes surface features that enhance use of the tool with several housing sizes, whereas Cochran's tool is designed to engage a single housing size.

OBJECTS AND ADVANTAGES

The objectives of the improvements disclosed in this document are:

a. Eliminate the abutment handle in Barrow's tool because this feature prohibits the use of a socket and air wrench to operate the tool.

b. Prevent the operator from drawing the bearing carrier beyond a desirable position in the gear case to avoid damage to the gear shifter.

The function of the abutment handle in Barrow's tool is to prevent rotation of the boss. If the boss rotates with the nut which is drawing it through the block, there is no travel of the boss relative to the block. In the present application, this feature is replaced with mating surface configurations between the boss and block which prohibit rotation of the boss relative to the block. A second rotation control feature is a surface configuration on the exterior of the block which allows the operator to grip the block with a wrench or pliers when the need arises. The advantage of these improvements over Barrow's tool is that an air wrench may be used which delivers a rapid burst of torque. This, of course, is far more effective than human strength in overcoming resistance.

Barrow's tool does not include a stop to prevent the operator from pulling the bearing carrier too far. While this feature is not necessary when the tool is operated by experienced hands, the inclusion of a stop makes it acceptable to delegate the task of bearing carrier removal to unskilled help.

In summary, the advantages of the present improvements over the prior art are: reduced time to perform task because an air wrench may be used; and reduced risk of damage to customer's gear shifter because of travel stop, which allows the task to be delegated to unskilled help.

SUMMARY OF THE INVENTION

The bearing carrier puller improvements disclosed in this document simplify the use of the bearing carrier puller designed by Randy Barrow and issued U.S. Pat. No. 4,236,291 in 1980. Barrow's bearing carrier puller is quite effective at performing its' intended job, however it requires the skills of a marine mechanic to be operated properly. Otherwise, there is great risk of damaging the gear shifter in the gear case being serviced. The improvements disclosed here eliminate the risk inherent in delegating this task to an unskilled employee. This improved tool achieves three distinct objectives.

First, it prevents damage to the gear shifter by an unskilled operator. The boss travel stop 5 prevents the boss 9 from withdrawing a bearing carrier beyond a given point where damage to a gear shifter results.

Second, it prevents damage to the tool by an unskilled operator. The nut travel stop 6 restricts the range of operation of the nut 7 to prevent the nut from continuing to drive the boss 9 once the boss and block 1 have met at the boss travel stop 5. The objective here is to minimize unnecessary stress on the block 1.

Third, the tool is configured to permit the use of a socket and air wrench to drive the nut 7. The male and female boss rotation prevention means 4 and 11 prevent rotation of the boss 9 relative to the block 1. In Barrow's design, a handle protrudes externally from the boss and serves this purpose. However, with a handle on the boss, a socket and air wrench can not be used to rotate the nut, a considerable defect. The male component of the boss rotation prevention means 4 is an external surface configuration on a first end of the boss 9 that conforms to an internal surface configuration, the female component of the boss rotation prevention means 11, on block 1. These surfaces are not true cylinders so movement about the axis of boss 9 is prevented. Movement is restricted to a linear progression along the axis of boss 9. An auxiliary improvement addressing this item is the block grip enhancement surface 10 on block 1. This consists of parallel flat surfaces on opposing sides of block 1, which allow an operator to grip the block with a wrench if the need arises.

OPERATION OF INVENTION

The bearing carrier puller improvements disclosed in this document reduce the task of bearing carrier removal to an unskilled level. The sequence of steps in the task are: remove the propeller nut and propeller; fit the puller over the exposed propeller shaft, with the nut 7 loosened; install a washer and nut on the end of the propeller shaft; and rotate nut 7 until the bearing carrier dislodges from the gear case.

REFERENCE NUMERALS IN DRAWINGS

Figure 1:
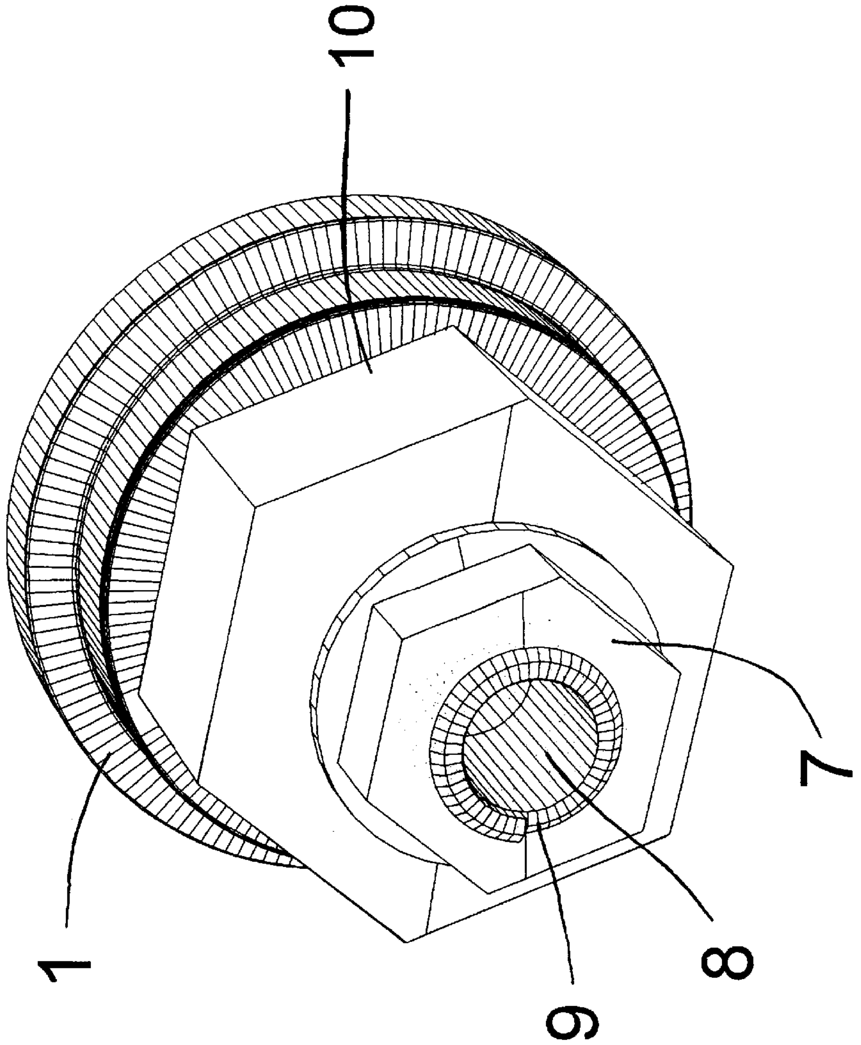
FIG. 1 illustrates a perspective view of a first embodiment of the invention.
Figure 2:
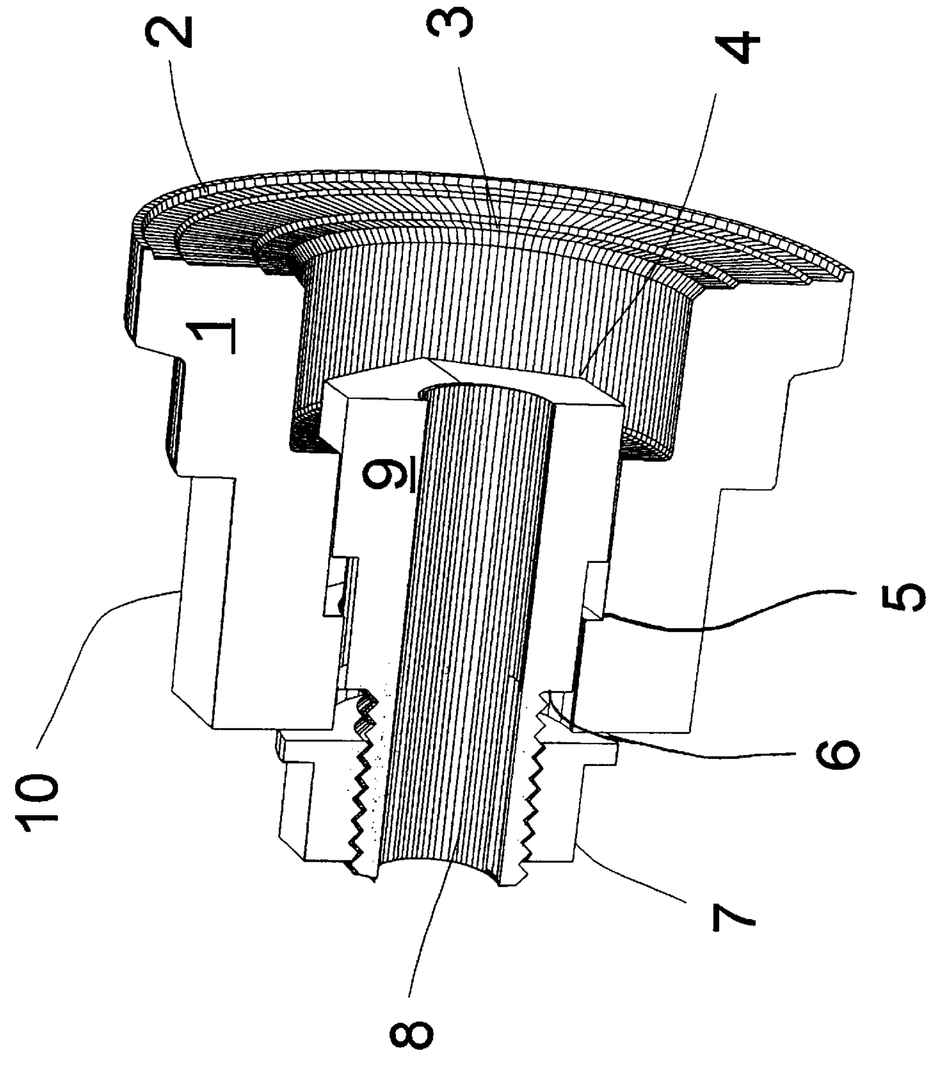
FIG. 2 is a cross section view of a first embodiment of the invention.
Figure 3:
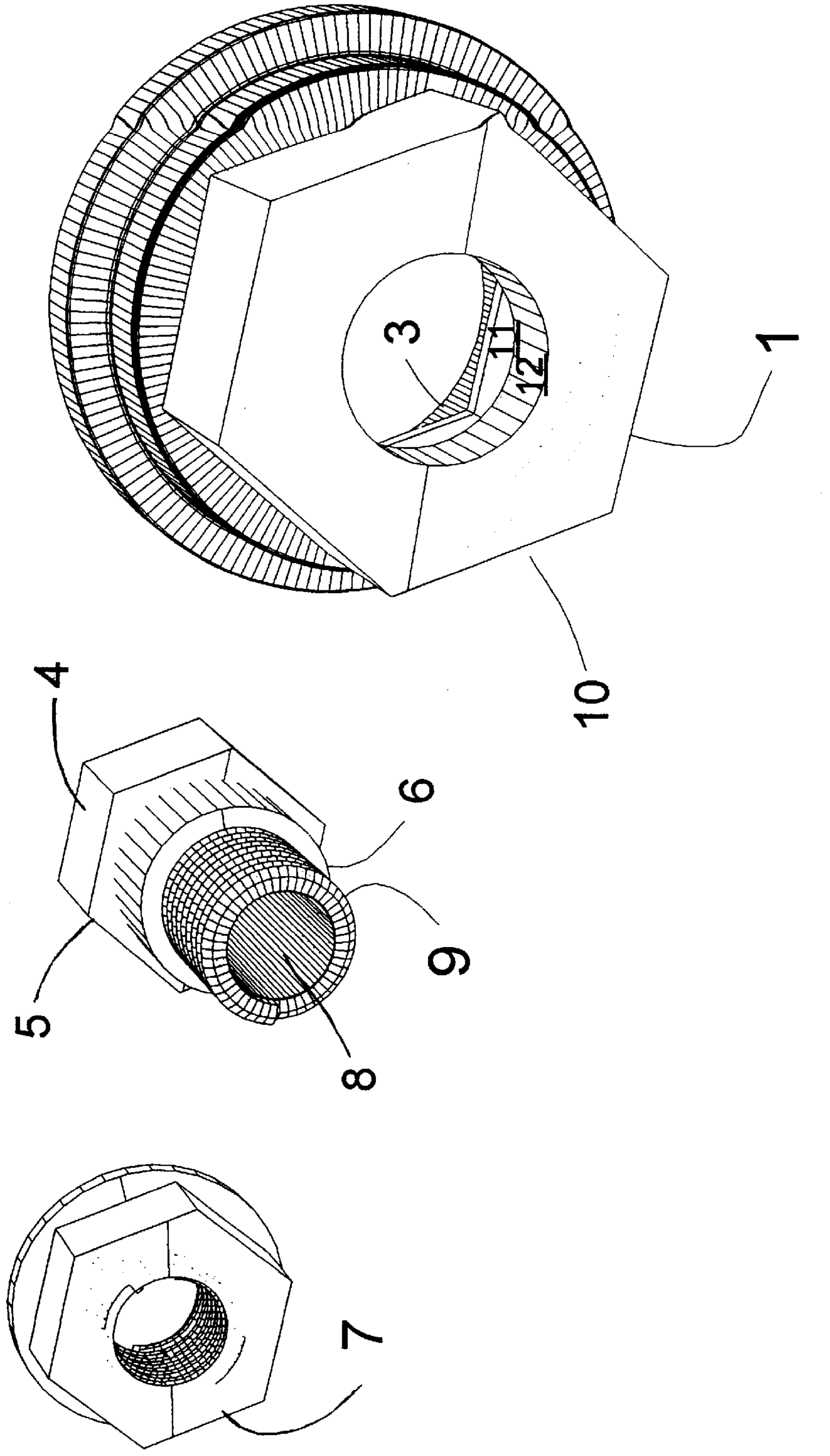
FIG. 3 is a first exploded view of a first embodiment of the invention.
Figure 4:
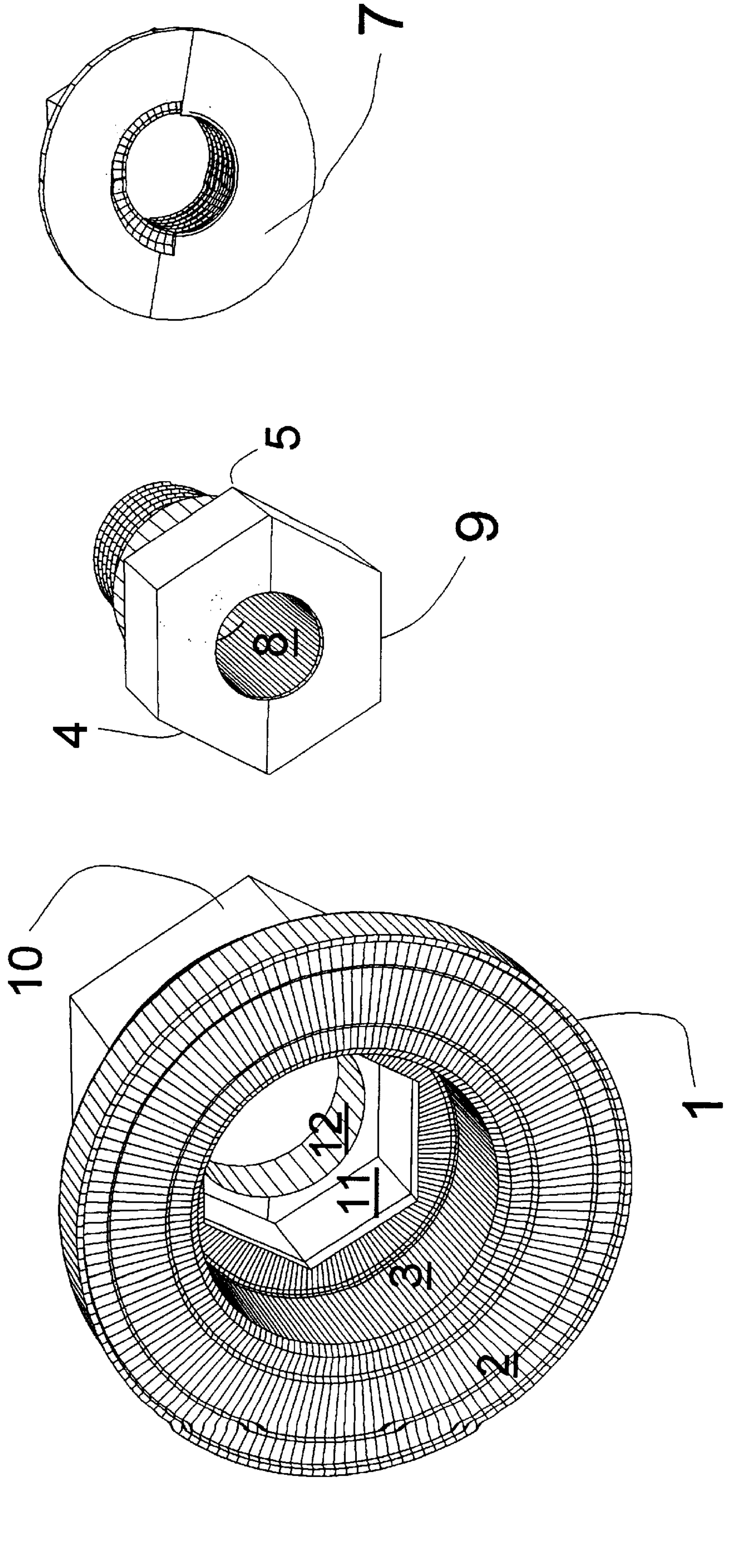
FIG. 4 is a second exploded view of the first embodiment of the invention.

1 Block
2 Gear case mating surface
3 Bearing Carrier receiving cavity, and first segment of cavity
4 Male component of boss rotation prevention means
5 Boss travel stop
6 Nut travel stop
7 Nut
8 Propeller shaft receiving cavity
9 Boss
10 Block grip enhancement surface
11 Female component of boss rotation prevention means, and second segment of cavity
12 Third segment of cavity

DESCRIPTION OF PREFERRED EMBODIMENT

The improved bearing carrier puller illustrated according to the invention is shown to have a block 1, a boss 9, and nut 7.

The block 1 is shown to have a through cavity of 3 segments with descending diameters from a first end to a second end of the block 1. The diameter of the through cavity is greatest at the first end of block 1. This segment of the cavity is cylindrical, is proportioned to receive a bearing carrier as it is dislodged, and is referred to by the reference numeral 3. The walls of the second segment of the cavity 11 are polygonal with the distance across the cavity being less than the diameter of the first segment. The third segment of the cavity 12 is cylindrical and has a smaller diameter than the comparable dimension for the second segment. The step at the juncture of the second and third segments serves as a stop 5 to prevent the boss from traveling beyond that point in the direction of the second end of block 1. The third segment of the cavity is open to the second end of the block 1. The first end of the block 1 has a plurality of circular gear case mating configurations 2. Extending along the periphery of the block from the second end for a given distance is a surface configuration which is polygonal, with parallel opposing sides 10 and which is suitable for gripping with a wrench.

The boss 9 is shown to have a through cavity 8 extending from a first end to a second end. This cavity is cylindrical. Extending along the periphery of boss 9 from the first end for a given distance is a surface configuration which is polygonal and mates with the second segment of the cavity 11 in block 1. The periphery of boss 9 from the second end for a given distance is threaded and mates with nut 7. Nut 7 is threaded and mates with the threading on boss 9.

The present invention has been described in some detail by way of illustrations for purposes of clarity and understanding, it will, of course, be understood that various changes and modifications may be made in the form, details, and arrangements of the parts without departing from the scope of the invention as set forth in the claims.

We claim:

1. A bearing carrier puller for extraction of a bearing carrier from a lower gear case of a marine drivetrain by exertion of a pulling force to a propeller shaft while applying a pushing force to an open end of said lower gear case, said bearing carrier puller consisting of a boss, a block, and a nut, said boss positionable about said propeller shaft with a first end positionable facing said bearing carrier and with an opposing second end, said block disposed about said boss with a first end positionable against the open end of a marine lower gear case and with an opposing second end, said first end of said boss extending through said first end of said block and said second end of said boss extending through said second end of said block, and said nut disposed about a periphery of said boss on said second end of said boss, in operation travel of said boss relative to said block is accomplished by rotation of said nut about the periphery of said boss in the direction of said first end of said boss causing said nut to bear against said block thereby causing said block to bear against said lower gear case causing a lateral pulling force to be exerted on said propeller shaft which extracts said propeller shaft and bearing carrier as a unit, bearing carrier puller thus described includes an improvement of:

a rotation restriction means integral to said boss that engages a corresponding rotation restriction means integral to said block, precluding rotation of said boss relative to said block.

2. A bearing carrier puller for extraction of a bearing carrier from a lower gear case of a marine drivetrain by exertion of a pulling force to a propeller shaft while applying a pushing force to an open end of said lower gear case, said bearing carrier puller consisting of a boss, a block, and a nut, said boss positionable about said propeller shaft with a first end positionable facing said bearing carrier and with an opposing second end, said block disposed about said boss with a first end positionable against the open end of a marine lower gear case and with an opposing second end, said first end of said boss extending through said first end of said block and said second end of said boss extending through said second end of said block, and said nut disposed about a periphery of said boss on said second end of said boss, in operation travel of said boss relative to said block is accomplished by rotation of said nut about the periphery of said boss in the direction of said first end of said boss causing said nut to bear against said block thereby causing said block to bear against said lower gear case causing a lateral pulling force to be exerted on said propeller shaft which extracts said propeller shaft and bearing carrier as a unit, bearing carrier puller thus described includes an improvement of:

a travel terminating means integral to said boss, precluding movement of said boss beyond a given position relative to said block.

3. A bearing carrier puller for extraction of a bearing carrier from a lower gear case of a marine drivetrain by exertion of a pulling force to a propeller shaft while applying a pushing force to an open end of said lower gear case, said bearing carrier puller consisting of a boss, a block, and a nut, said boss positionable about said propeller shaft with a first end positionable facing said bearing carrier and with an opposing second end, said block disposed about said boss with a first end positionable against the open end of a marine lower gear case and with an opposing second end, said first end of said boss extending through said first end of said block and said second end of said boss extending through said second end of said block, and said nut disposed about a periphery of said boss on said second end of said boss, in operation travel of said boss relative to said block is accomplished by rotation of said nut about the periphery of said boss in the direction of said first end of said boss causing said nut to bear against said block thereby causing said block to bear against said lower gear case causing a lateral pulling force to be exerted on said propeller shaft which extracts said propeller shaft and bearing carrier as a unit, bearing carrier puller thus described includes an improvement of:

an exterior surface configuration integral to said block which is polygonal, providing an enhanced gripping means.

* * * * *